United States Patent
Bawa et al.

(10) Patent No.: US 11,902,389 B2
(45) Date of Patent: Feb. 13, 2024

(54) MECHANISM TO FACILITATE SIGNALING TRAFFIC

(71) Applicant: Nokia Solutions and Networks Oy, Espoo (FI)

(72) Inventors: Satvinder Bawa, Ontario (CA); Mahesh Gopalakrishna Pai Ramanth, Bengaluru (IN); Sreekant Nair, Bengaluru (IN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/597,660

(22) PCT Filed: Jul. 20, 2020

(86) PCT No.: PCT/US2020/042708
§ 371 (c)(1),
(2) Date: Jan. 17, 2022

(87) PCT Pub. No.: WO2021/011933
PCT Pub. Date: Jan. 21, 2021

(65) Prior Publication Data
US 2022/0272165 A1    Aug. 25, 2022

Related U.S. Application Data

(60) Provisional application No. 62/875,697, filed on Jul. 18, 2019.

(51) Int. Cl.
*H04L 67/51*    (2022.01)
*H04L 67/563*   (2022.01)

(52) U.S. Cl.
CPC ............ *H04L 67/51* (2022.05); *H04L 67/563* (2022.05)

(58) Field of Classification Search
CPC ....... H04L 67/51; H04L 67/563; H04L 67/30; H04L 67/303; H04L 67/306; H04L 63/102

(Continued)

(56) References Cited

U.S. PATENT DOCUMENTS 6,886,017 B1 *   4/2005   Jackson ................... G06F 8/60
                                                      707/999.102
7,057,591 B1 *   6/2006   Hautanen ........... G06Q 30/0277
                                                         705/14.66

(Continued)

FOREIGN PATENT DOCUMENTS

CN         107209694 A1     9/2017
WO     WO-2018/206441 A1   11/2018

(Continued)

*Primary Examiner* — Thu Ha T Nguyen
(74) *Attorney, Agent, or Firm* — Harrington & Smith

(57) ABSTRACT

Apparatuses, non-transitory program storage devices, and methods to implement a network function proxy are described. An example apparatus includes at least one non-transitory memory including computer program code configured with at least one processor to cause the apparatus to perform updating a profile including data associated with a producer network function in response to a registration request of the producer network function by adding a token identifier to a service identifier associated with a service of the producer network function, forwarding the updated profile to a network function repository function, wherein at least one internet protocol address is updated so that a proxy function is an endpoint for use of the service, storing and maintaining a mapping between the token identifier and the service of the producer network function, and providing the updated profile to a consumer network function in response to a discovery request for the service.

20 Claims, 3 Drawing Sheets

(58) Field of Classification Search
USPC .......................................................... 709/217
See application file for complete search history.

(56) References Cited

U.S. PATENT DOCUMENTS

| | | | | |
|---|---|---|---|---|
| 7,716,077 | B1* | 5/2010 | Mikurak | G06Q 10/0631 705/7.12 |
| 8,412,199 | B2* | 4/2013 | Oh | H04W 36/005 455/442 |
| 8,788,597 | B2* | 7/2014 | Levow | H04L 51/42 709/205 |
| 10,893,238 | B2* | 1/2021 | Eilertsen | H04N 7/181 |
| 11,283,883 | B1* | 3/2022 | Krishan | H04W 4/80 |
| 11,425,636 | B1* | 8/2022 | Aggarwal | H04W 12/08 |
| 11,564,266 | B1* | 1/2023 | Kahn | H04M 15/785 |
| 11,743,363 | B1* | 8/2023 | Goel | H04L 67/563 709/201 |
| 2007/0237159 | A1* | 10/2007 | Yamada | H04L 45/60 370/395.53 |
| 2010/0274597 | A1* | 10/2010 | Dill | G06Q 40/00 705/7.29 |
| 2012/0036494 | A1* | 2/2012 | Gurumohan | G06Q 10/103 709/219 |
| 2014/0258469 | A1* | 9/2014 | Maharajh | H04N 21/6112 709/219 |
| 2014/0380041 | A1* | 12/2014 | Gupta | H04L 61/5076 713/162 |
| 2015/0215408 | A1* | 7/2015 | Nguyen | H04L 41/5054 709/223 |
| 2019/0141495 | A1* | 5/2019 | Jha | H04W 40/026 |
| 2020/0296571 | A1* | 9/2020 | Puente Pestaña | H04L 67/51 |
| 2021/0075794 | A1* | 3/2021 | Gazit | H04L 63/1408 |
| 2021/0258871 | A1* | 8/2021 | Jeong | H04W 24/02 |
| 2021/0377357 | A1* | 12/2021 | Yao | H04L 67/1087 |
| 2022/0015023 | A1* | 1/2022 | De-Gregorio-Rodriguez | H04L 67/02 |
| 2022/0272165 | A1* | 8/2022 | Bawa | H04L 67/51 |
| 2022/0361085 | A1* | 11/2022 | Rajput | H04W 12/02 |
| 2023/0079238 | A1* | 3/2023 | Cristache | G05D 1/0297 706/46 |
| 2023/0188963 | A1* | 6/2023 | Sapra | H04W 48/18 455/414.1 |
| 2023/0300111 | A1* | 9/2023 | Woodworth | H04L 61/4511 726/4 |

FOREIGN PATENT DOCUMENTS

WO   WO2019/071584 A1   4/2019
WO   WO 2019/076801 A1   4/2019

* cited by examiner

MECHANISM TO FACILITATE SIGNALING TRAFFIC

CROSS REFERENCE TO RELATED APPLICATION

This patent application is a U.S. National Stage application of International Patent Application Number PCT/US2020/042708 filed Jul. 20, 2020, which is hereby incorporated by reference in its entirety, and claims priority to U.S. provisional application 62/875,697 filed Jul. 18, 2019, which is hereby incorporated by reference in its entirety.

TECHNICAL FIELD

The examples and non-limiting embodiments relate generally to communications and, more particularly, to a mechanism to facilitate signaling traffic.

BACKGROUND

It is known to provide services to application components over a communication network.

SUMMARY

The following summary is merely intended to be an example. The summary is not intended to limit the scope of the claims.

In accordance with one aspect, an apparatus includes at least one processor, at least one non-transitory memory including computer program code, wherein the at least one memory and the computer program code are configured to, with the at least one processor, cause the apparatus at least to perform: updating a profile comprising data associated with a producer network function in response to a registration request of the producer network function by adding a token identifier to a service identifier associated with a service of the producer network function; forwarding the updated profile to a network function repository function, wherein at least one internet protocol address is updated so that a proxy function is an endpoint for use of the service; storing and maintaining a mapping between the token identifier and the service of the producer network function; and providing the updated profile to a consumer network function in response to a discovery request for the service.

In accordance with another aspect, a non-transitory program storage device readable by a machine may be provided, the non-transitory program storage device readable by a machine tangibly embodying a program of instructions executable by the machine for performing operations, the operations comprising: updating a profile comprising data associated with a producer network function in response to a registration request of the producer network function by adding a token identifier to a service identifier associated with a service of the producer network function; forwarding the updated profile to a network function repository function, wherein at least one internet protocol address is updated so that a proxy function is an endpoint for use of the service; storing and maintaining a mapping between the token identifier and the service of the producer network function; and providing the updated profile to a consumer network function in response to a discovery request for the service.

In accordance with another aspect, an apparatus includes means for updating a profile comprising data associated with a producer network function in response to a registration request of the producer network function by adding a token identifier to a service identifier associated with a service of the producer network function; means for forwarding the updated profile to a network function repository function, wherein at least one internet protocol address is updated so that a proxy function is an endpoint for use of the service; means for storing and maintaining a mapping between the token identifier and the service of the producer network function; and means for providing the updated profile to a consumer network function in response to a discovery request for the service.

In accordance with another aspect, a method includes updating a profile comprising data associated with a producer network function in response to a registration request of the producer network function by adding a token identifier to a service identifier associated with a service of the producer network function; forwarding the updated profile to a network function repository function, wherein at least one Internet protocol address is updated so that a proxy function is an endpoint for use of the service; storing and maintaining a mapping between the token identifier and the service of the producer network function; and providing the updated profile to a consumer network function in response to a discovery request for the service.

BRIEF DESCRIPTION OF THE DRAWINGS

The foregoing aspects and other features are explained in the following description, taken in connection with the accompanying drawings, wherein.

DETAILED DESCRIPTION OF EXAMPLE EMBODIMENTS

Figure 1:
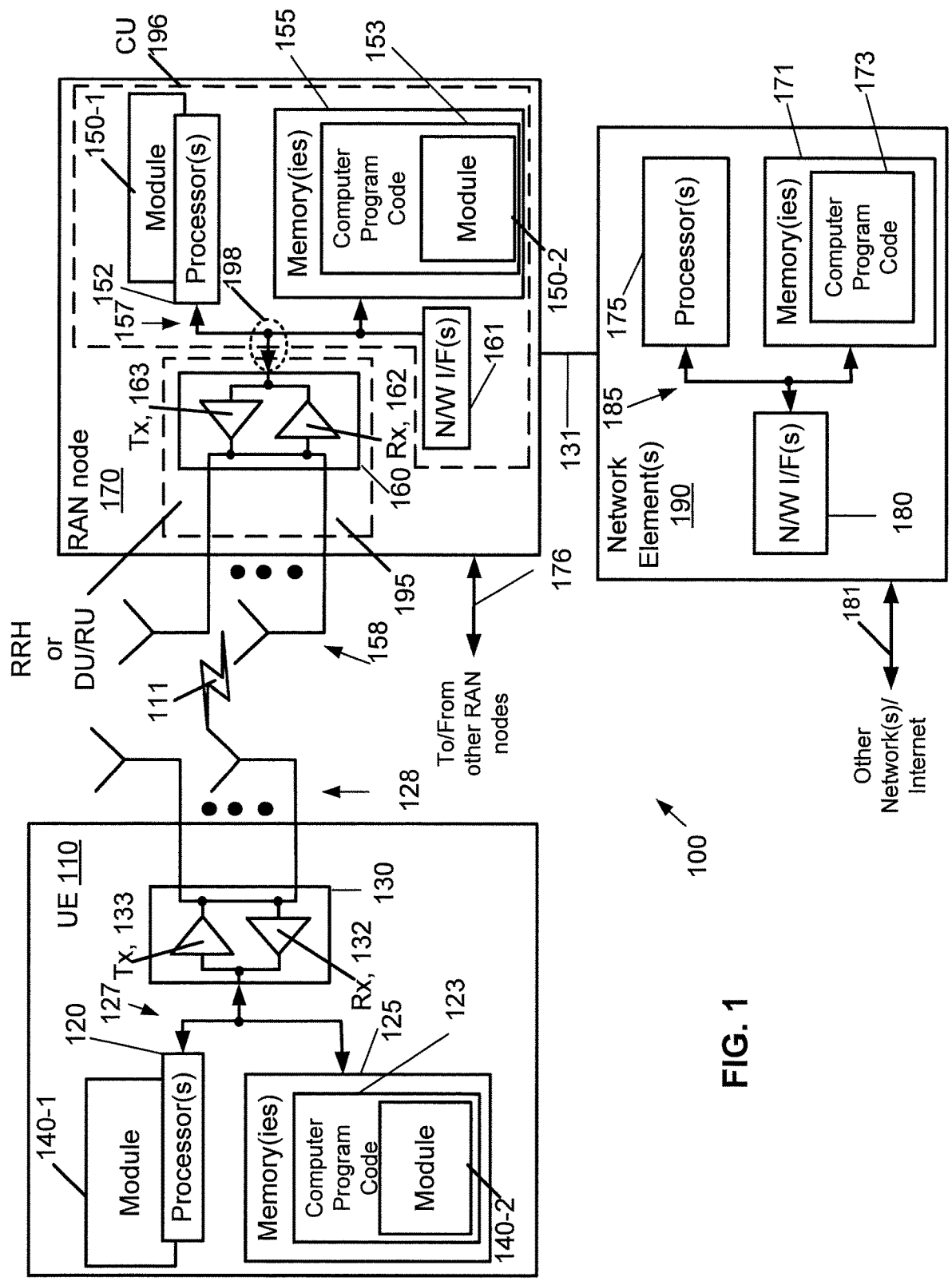
FIG. 1 is a block diagram of one possible and non-limiting system in which the example embodiments may be practiced.

The following acronyms and abbreviations that may be found in the specification and/or the drawing figures are defined as follows:
3GPP third generation partnership project
5G fifth generation
5GC 5G core network
AMF access and mobility management function
CU central unit
DU distributed unit
DSP digital signal processor
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FDD frequency division duplex
gNB (or gNodeB) base station for 5G/NR, i.e., a node providing NR user plane and control plane protocol terminations towards the UE, and connected via the NG interface to the 5GC
HTTP hyper text transfer protocol
HTTP2 hyper text transfer protocol version 2

IPv4 (or IPv6) internet protocol version 4 (or internet protocol version 6)
I/F interface
LTE long term evolution
MAC medium access control
MME mobility management entity
NF network function
ng or NG new generation
ng-eNB or NG-eNB new generation eNB
NR new radio
NRF NF repository function
N/W or NW network
PDA personal digital assistant
PDCP packet data convergence protocol
PHY physical layer
RAN radio access network
Rel. release
RLC radio link control
RRH remote radio head
RRC radio resource control
RU radio unit
Rx receiver
SCP service communication proxy
SDAP service data adaptation protocol
SGW serving gateway
SMF session management function
TS technical specification
Tx transmitter
UE user equipment (e.g., a wireless, typically mobile device)
UPF user plane function
URI universal resource identifier Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that may access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting radio resource control (RRC), SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 may be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there may be multiple cells per base station. For example, there may be three cells for a single carrier frequency and associated bandwidth, each cell covering one-third of a 360 degree area so that the single base station's coverage area covers an approximate oval or circle. Furthermore, each cell may correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 may include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Disclosed herein are methods and apparatuses to implement and provide functions that may be foreseen for a 3rd Generation Partnership Project (3GPP) service communication proxy (SCP). However, features as described herein may be used other than with service communication proxy and is not limited to service communication proxy. This disclosure generally relates to a service based architecture (SBA) in a wireless communication network, particularly to an enhanced SBA (see, e.g., TR 23.742). In SBA Network Functions (NFs) are service producers and/or service consumers. A NF as service producer may register its service(s) with the NF Repository Function (NRF), and a service consumer NF may then discover a specific service producer NF by contacting the NRF.

For Rel. 15 it is specified that each NF is to contact the NRF and further NFs directly. This, however, is not really feasible in real deployments. Therefore, Rel. 16 introduces a "service communication proxy" (SCP). For example, in 3GPP the 5G system architecture enables each network function and its network function services to interact with other NF and its Network Function Services directly or indirectly via the SCP (e.g., Rel. 16 TS 23.501).

However, the functionality of the SCP is not yet defined. The disclosure herein describes an entity or function that may be inserted without any changes to the behavior of NFs and NRF. This function may for example be called network function proxy (NF Proxy) or network function repository function proxy (NRF Proxy). As used herein, the entity or function is referred to as the NF Proxy. The NF Proxy is transparent to all further entities, such as further 3GPP entities. As the NF Proxy is transparent, this concept may be used already for current (e.g. Rel. 15) networks.

Function endpoints of the NF Proxy are configured as the NRFs. All NRF traffic then lands at the new function. During registration of a NF service the new function updates or manipulates the NF Profile such that the respective IP addresses may lead to the new function. In one implementation example, the function adds an identifier (a "magic token") to the hyper text transfer protocol (HTTP) universal resource identifier (URI) prefix of the service. The NF Proxy maintains a mapping between the identifier and the service. The manipulated service registration request may be forwarded to the NRF. When a service consumer performs service discovery at the NRF, the service consumer may receive the manipulated NF profile. The service consumer may, thus, subsequently contact the NF Proxy. The NF Proxy knows from the identifier (in the prefix) which service the consumer actually requests. The NF Proxy may forward the traffic accordingly. Also, all further traffic may go through the NF Proxy.

NRF is a network service in the 5G core which acts as a registrar of all the network functions operating in the 5G core. A communication proxy is a network function in the 5G core that facilitates routing of 5G HTTP2 signalling traffic. The communication proxy also provides additional capabilities such as interworking, mediation, rate limiting, load balancing etc. The communication proxy ensures that the complexity of the 5GC is reduced by having a single consolidate point of contact for all the network functions. NRF and the communication proxy may be deployed independently.

5G Core Network (5GC) includes a large number of services and service instances. Since a single point of contact is the communication proxy, the communication proxy may have the visibility of all the network functions. A problem may arise from the fact that individual NFs are registered directly onto the NRF. In an SBA, a consumer service or a NF may discover the producer services from the NRF through a discovery procedure defined as per 3GPP TS 29510 specification. In this kind of a discovery procedure, the communication proxy is not in the path of the signalling. This procedure negates the advantages a communication proxy may bring into a 5GC.

Accordingly, features as described herein may be used to provide a method and apparatus to resolve the issue of the communication proxy not being in the signalling path between any NFs. This may be achieved by:
1. By becoming a transparent proxy for the NRF (indicating that the NF Proxy is the NRF), the NF Proxy may intercept and influence all interactions of NFs and NRFs;
2. Different NFs exchange information with the NRF using a NF profile. A NF profile is the data model which describes the capability and the endpoint definitions of each NF that registers with the NRF. The NF Proxy provides means to intercept and interpret the NF profile if required. The NF Proxy achieves this by manipulating the NF profile during registration prior to forwarding the request to the NRF.

Accordingly, disclosed herein is a method and apparatus that may configure NF Proxy endpoints as the NRFs in 5GC. The NRF traffic hence lands on the NF Proxy and then gets proxied to the actual NRF. This provides the NF Proxy an opportunity to manipulate the service details during the registration procedure of a NF.

The NF Proxy prefixes a magic token to the HTTP URI prefix for each of the services. This token may uniquely identify each instance of a registered service. The NF Proxy maintains a mapping between the token and the service instance. Additionally, the IP addresses (such as internet protocol version 4 (IPv4) & internet protocol version 6 (IPv6) addresses) may be manipulated to expose NF Proxy endpoints. Hence, the actual NF profile details that get registered with the NRF may have the NF Proxy endpoint for service consumption.

During a discovery procedure as defined in 3GPP TS 29510, a consumer service when it contacts the NRF for service details of a producer, the consumer service may receive the NF profiles with:
1. Service endpoints modified to point to the NF Proxy
2. An HTTP prefix of each service prepended with the magic token Based on the discovery response, the consumer NF may contact the NF Proxy with the prepended service URI. The NF Proxy may now identify the actual destination service instance using the magic token in the URI. This may ensure that further traffic may flow through the NF Proxy.

Figure 2:
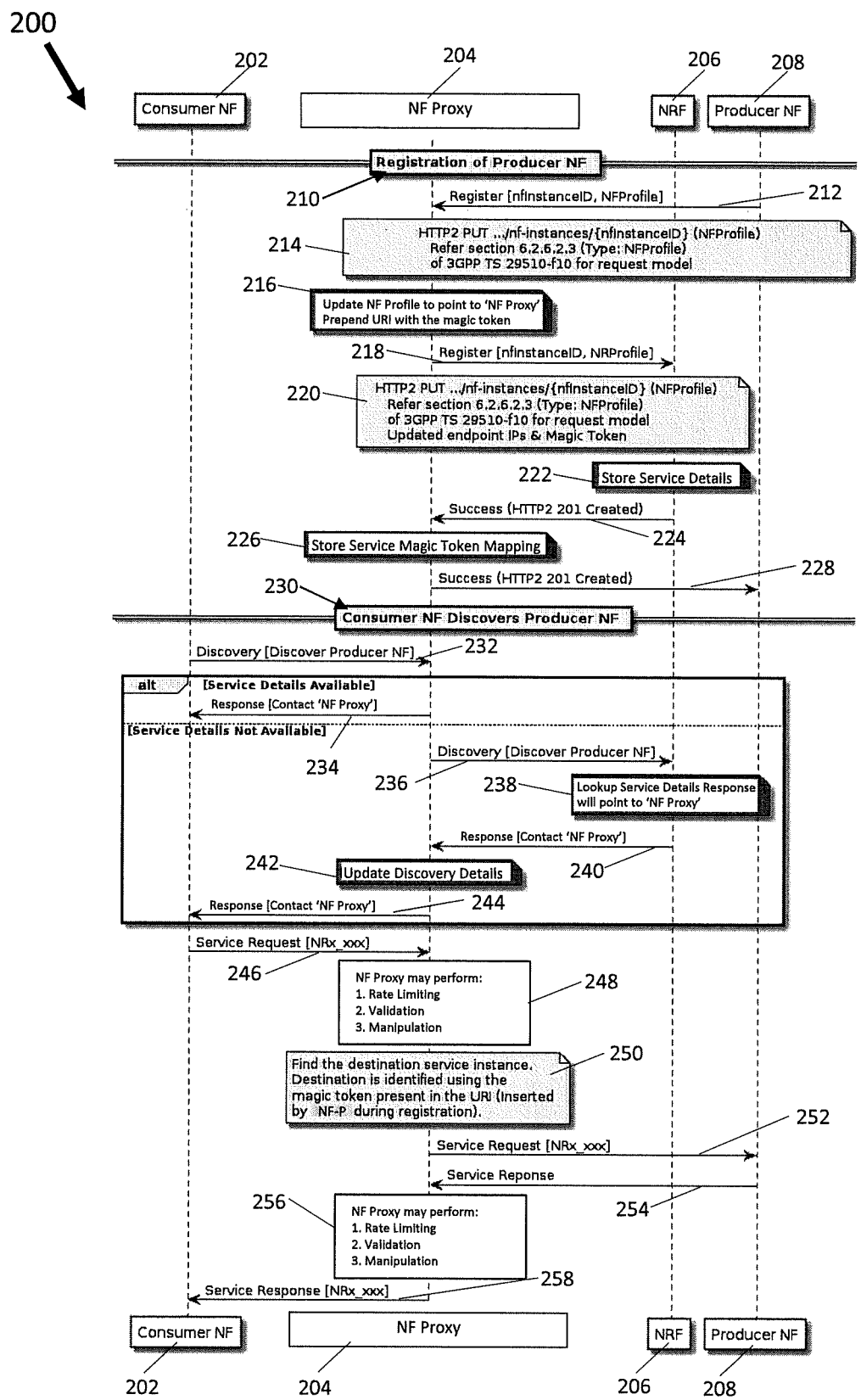
FIG. 2 illustrates an example configuration of a network function proxy ("NF Proxy").

FIG. 2 illustrates an example configuration 200 of a NF Proxy. In FIG. 2, the NF Proxy 204 is in the signaling path of a consumer NF 202 and a producer NF 208. The NF Proxy 204 acts as a transparent proxy for the NRF 206. Illustrated in FIG. 2 is the process 210 of registration of the producer NF 208 as well as the process 230 of the consumer NF 202 discovering the producer NF 208.

An example process 210 of registration of the producer NF 208 proceeds as follows. At 212, the producer NF 208 initiates a registration request, which as shown includes the parameters nfinstanceID and NFProfile. The parameter NFProfile corresponds to the NF Profile, or the data model which describes the capability and the endpoint definitions of the producer NF 208. The registration request is implemented at 214 as an HTTP2 PUT method. At 216, the NF Proxy 204 updates the NF Profile to point to the NF Proxy 204, and prepends the URI with the magic token. At 218, the NF Proxy 204 forwards the registration request to the NRF 206. The forwarding of the registration request by the NF Proxy 204 to the NRF 206 is implemented at 220 as an HTTP2 PUT method such that the IPs (e.g., IPv4 and IPv6 addresses) are updated so that the endpoints of the NF Proxy 204 is (e.g., is a proxy for) the NRF 206. At 220, the magic token is also provided to the NRF 206 via the registration request forwarding. At 222, the service details are stored with the NRF 206, and at 224 the NRF 206 provides a success indication to the NF Proxy 204 via a status response code. In FIG. 2, the status response code is an HTTP2 201 Created code. At 226, the NF Proxy 204 stores a mapping between the magic token and the service instance being provided by the producer NF 208. At 228, the NF Proxy 204 provides a success indication to the producer NF 208 via a status response code such as an HTTP2 201 Created code.

An example process 230 by which the consumer NF 202 discovers the producer NF 208 proceeds as follows. At 232, the consumer NF 202 initiates a discovery procedure to contact the NRF 206 for service details of a producer, or to discover the producer NF 208. As shown in FIG. 2, the NF Proxy 204 has intercepted the discovery procedure initiated by the consumer NF 202 at 232. At 234, the NF Proxy 204 indicates to the consumer NF 202 to contact the NF Proxy 204 to perform the discovery request. At 236, the NF Proxy 204 forwards the discovery procedure to discover the producer NF 208 to the NRF 206. At 238, the lookup service details response may point to the NF Proxy 204. At 240, the NRF 206 may forward a contact NF Proxy response to the NF Proxy 204. At 242, the NF Proxy 204 updates discovery details, and at 244, the NF Proxy 204 forwards a contact NF Proxy response to the consumer NF 202. After the response at 244, the NF Proxy 204 may serve a service request from the consumer NF 202. Furthermore, the consumer NF 202 now knows to initiate a service request with the NF Proxy.

At 246, via the parameter NRx_xxx, the consumer NF 202 initiates a service request to the NF Proxy 204. At 248, in response to the initiated service request, the NF Proxy 204 may perform one or more of rate limiting, validation, and manipulation. At 250, the NF Proxy 204 finds the destination service instance. The destination is identified using the magic token present in the URI (inserted by the NF Proxy (the "NF-P") during registration). At 252, the NF Proxy forwards the service request to the producer NF 208. At 254, the producer NF 208 provides a service response to the NF Proxy. At 256, the NF Proxy may perform one or more of rate limiting, validation, and manipulation. At 258, the NF Proxy 204 provides the service response via parameter NRx_xxx to the consumer NF 202.

Figure 3:
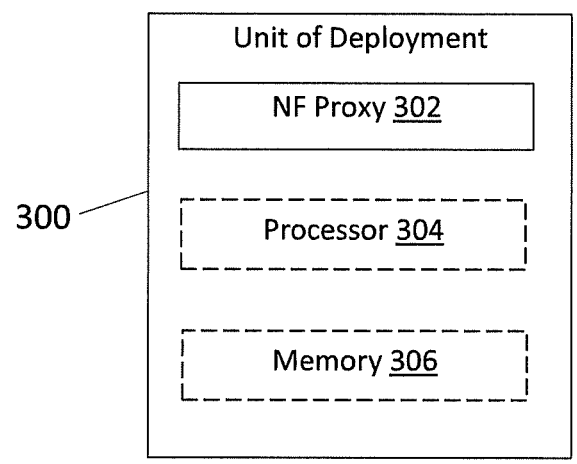
FIG. 3 illustrates an example unit of deployment of a NF Proxy.

FIG. 3 illustrates an example unit of deployment 300 of a NF Proxy 302, including optional processor 304 and memory 306. The NF Proxy 302 may be deployed or implemented as a standalone unit, in which case the unit of deployment 300 has a processor 304 and memory 306 and the NF Proxy 302 includes computer program code to implement the functionality of the NF Proxy 302. Alternatively, the unit of deployment 300 may be either the UE 110, the RAN node 170, or the network element 190. In the example where the unit of deployment 300 is the UE 100, the NF Proxy 302 is included in the computer program code 123. In the example where the unit of deployment 300 is the RAN node 170, the NF Proxy 302 is included in the computer program code 153. In the example where the unit of deployment 300 is the network element 190, the NF Proxy 302 is included in the computer program code 173. The unit of deployment 300 may in various ways be combined with, or meshed with, other functions or modules such as the consumer NF 202, producer NF 208, and/or the NRF 206 such as those shown in FIG. 2. Alternatively, the unit of deployment 300 may be deployed independently of the consumer NF 202, the producer NF 208, and the NRF 206.

In accordance with an example apparatus, an apparatus may be provided that includes at least one processor, at least one non-transitory memory including computer program code, wherein the at least one memory and the computer program code are configured to, with the at least one processor, cause the apparatus at least to perform: updating a profile comprising data associated with a producer network function in response to a registration request of the producer network function by adding a token identifier to a service identifier associated with a service of the producer network function; forwarding the updated profile to a network function repository function, wherein at least one internet protocol address is updated so that a proxy function is an endpoint for use of the service; storing and maintaining a mapping between the token identifier and the service of the producer network function; and providing the updated profile to a consumer network function in response to a discovery request for the service.

In accordance with an example non-transitory program storage device readable by a machine, a non-transitory program storage device readable by a machine may be provided, the non-transitory program storage device readable by a machine tangibly embodying a program of instructions executable by the machine for performing operations, the operations comprising: updating a profile comprising data associated with a producer network function in response to a registration request of the producer network function by adding a token identifier to a service identifier associated with a service of the producer network function; forwarding the updated profile to a network function repository function, wherein at least one internet protocol address is updated so that a proxy function is an endpoint for use of the service; storing and maintaining a mapping between the token identifier and the service of the producer network function; and providing the updated profile to a consumer network function in response to a discovery request for the service.

In accordance with an example apparatus, an apparatus may be provided that includes means for updating a profile comprising data associated with a producer network function in response to a registration request of the producer network function by adding a token identifier to a service identifier associated with a service of the producer network function; means for forwarding the updated profile to a network function repository function, wherein at least one internet protocol address is updated so that a proxy function is an endpoint for use of the service; means for storing and maintaining a mapping between the token identifier and the service of the producer network function; and means for providing the updated profile to a consumer network function in response to a discovery request for the service.

In accordance with an example method, a method may be provided that includes updating a profile comprising data associated with a producer network function in response to a registration request of the producer network function by adding a token identifier to a service identifier associated with a service of the producer network function; forwarding the updated profile to a network function repository function, wherein at least one internet protocol address is updated so that a proxy function is an endpoint for use of the service; storing and maintaining a mapping between the token identifier and the service of the producer network function; and providing the updated profile to a consumer network function in response to a discovery request for the service.

It should be understood that the foregoing description is only illustrative. Various alternatives and modifications may be devised by those skilled in the art. For example, features recited in the various dependent claims may be combined with each other in any suitable combination(s). In addition, features from different embodiments described above may be selectively combined into a new embodiment. Accordingly, the description is intended to embrace all such alternatives, modifications and variances which fall within the scope of the appended claims.

What is claimed is:

1. An apparatus comprising:
   at least one processor; and
   at least one non-transitory memory including computer program code;
   wherein the at least one memory and the computer program code are configured to, with the at least one processor, cause the apparatus at least to perform:
      updating a profile comprising data associated with a producer network function in response to a registration request of the producer network function by adding a token identifier to a service identifier associated with a service of the producer network function;
      forwarding the updated profile to a network function repository function, wherein at least one internet protocol address is updated so that a proxy function is an endpoint for use of the service;

storing and maintaining a mapping between the token identifier and the service of the producer network function; and providing the updated profile to a consumer network function in response to a discovery request for the service.

2. The apparatus of claim 1, wherein the updated profile provided to the consumer network function comprises:

service endpoints updated to point to the proxy function; and the added a token identifier to the service identifier of the service of the producer network function.

3. The apparatus of claim 2, wherein subsequent requests initiated by the consumer network function for the service provided by the producer network function are forwarded to the proxy function with the updated profile.

4. The apparatus of claim 1, wherein the proxy function forwards the discovery request to the network function repository function in response to the discovery request, and the proxy function updates discovery details associated with the discovery request in response to receiving an indication from the network function repository function to contact the proxy function.

5. The apparatus of claim 1, wherein the proxy function locates the destination of the service of the producer network function in response to the discovery request by using the token identifier added to the service identifier.

6. The apparatus of claim 1, wherein the apparatus is deployed without any changes to the producer network function, the consumer network function, and the network function repository function.

7. The apparatus of claim 1, wherein:

the producer network function provides a service response to the proxy function in response to a service request forwarded by the proxy function; and wherein the proxy function provides a service response to the consumer network function in response to the discovery request.

8. The apparatus of claim 1, wherein the service identifier is a hyper text transfer protocol universal resource identifier of the service of the producer network function.

9. The apparatus of claim 1, wherein the proxy function maintains a mapping between the token identifier and the service for each service instance of the producer network function.

10. The apparatus of claim 1, wherein the proxy function performs one or more of rate limiting, validation, manipulation, interworking, and mediation.

11. A non-transitory program storage device readable by a machine, tangibly embodying a program of instructions executable by the machine for performing operations, the operations comprising:

updating a profile comprising data associated with a producer network function in response to a registration request of the producer network function by adding a token identifier to a service identifier associated with a service of the producer network function;

forwarding the updated profile to a network function repository function, wherein at least one internet protocol address is updated so that a proxy function is an endpoint for use of the service;

storing and maintaining a mapping between the token identifier and the service of the producer network function; and providing the updated profile to a consumer network function in response to a discovery request for the service.

12. A method comprising:

updating a profile comprising data associated with a producer network function in response to a registration request of the producer network function by adding a token identifier to a service identifier associated with a service of the producer network function;

forwarding the updated profile to a network function repository function, wherein at least one internet protocol address is updated so that a proxy function is an endpoint for use of the service;

storing and maintaining a mapping between the token identifier and the service of the producer network function; and providing the updated profile to a consumer network function in response to a discovery request for the service.

13. The method of claim 12, wherein the updated profile provided to the consumer network function comprises:

service endpoints updated to point to the proxy function; and the added a token identifier to the service identifier of the service of the producer network function.

14. The method of claim 13, wherein subsequent requests initiated by the consumer network function for the service provided by the producer network function are forwarded to the proxy function with the updated profile.

15. The method of claim 12, wherein the proxy function forwards the discovery request to the network function repository function in response to the discovery request, and the proxy function updates discovery details associated with the discovery request in response to receiving an indication from the network function repository function to contact the proxy function.

16. The method of claim 12, wherein the proxy function locates the destination of the service of the producer network function in response to the discovery request by using the token identifier added to the service identifier.

17. The method of claim 12, wherein the apparatus is deployed without any changes to the producer network function, the consumer network function, and the network function repository function.

18. The method of claim 12, wherein:

the producer network function provides a service response to the proxy function in response to a service request forwarded by the proxy function; and wherein the proxy function provides a service response to the consumer network function in response to the discovery request.

19. The method of claim 12, wherein the service identifier is a hyper text transfer protocol universal resource identifier of the service of the producer network function.

20. The method of claim 12, wherein the proxy function maintains a mapping between the token identifier and the service for each service instance of the producer network function.

* * * * *